United States Patent
Shinjo et al.

[11] Patent Number: 5,938,132
[45] Date of Patent: Aug. 17, 1999

[54] SOLID SUBSTANCE GRANULATING APPARATUS LOADED ON A VEHICLE

[75] Inventors: Hiroshi Shinjo, Okinawa ken; Toyoyuki Okamoto, Yamaguchi ken, both of Japan

[73] Assignees: Trim Co., Ltd., Okinawa-ken; Toyo System Plants Co., Ltd., Yamaguchi-ken, both of Japan

[21] Appl. No.: 08/915,615

[22] Filed: Aug. 21, 1997

[30] Foreign Application Priority Data

Feb. 21, 1997 [JP] Japan .................................. 9-053867

[51] Int. Cl.⁶ .................................................. B02C 21/02
[52] U.S. Cl. ........................ 241/79.1; 241/99; 241/101.74
[58] Field of Search .................................. 241/709.1, 99, 241/101.74, 101.741, 101.742, 24.22

[56] References Cited

U.S. PATENT DOCUMENTS

| | | | |
|---|---|---|---|
| 4,389,020 | 6/1983 | Clin et al. | 241/24.22 |
| 4,852,815 | 8/1989 | Giannotti | 241/101.741 |
| 5,333,797 | 8/1994 | Becker et al. | 241/24.22 |

*Primary Examiner*—Mark Rosenbaum
*Attorney, Agent, or Firm*—Sughrue, Mion, Zinn, Macpeak & Seas, PLLC

[57] ABSTRACT

An object of the invention is to provide a solid substance granulating apparatus loaded on a vehicle, which is able to move to a collection place of inorganic solid substances of glass products, chinaware, salt silicate minerals, etc. of tourmaline, etc., in order to crush and treat the same, is able to automatically granulate the same in order to remove sharp edges of the crushed substances, and to screen the same according grain sizes, and which is excellent in the treatment work of inorganic solid substances, wherein the solid substance granulating apparatus loaded on a vehicle comprises a crushing machine 4 installed on the deck 3 of a vehicle 2, a charging device 5 connected to the crushing machine 4, a crushed substance discharge device 6 connected to the crushing machine 4, a crushed substance transfer device 7 connected to the crushed substance discharge device 6, a granulating apparatus 8 for granulating crushed substances transferred by the crushed substance transfer device 7, a granulated substance transfer device 9 connected to the granulating apparatus 8 for transferring granulated substances, a paper, etc. separating device 10 disposed at the downstream side of the granulated substance transfer device 9, a granulated product transfer device 12 connected to the paper, etc. separating device 10, and a screening device 13 connected to the granulated product transfer device 12 for screening and classifying the same according to grains sizes.

8 Claims, 6 Drawing Sheets

SOLID SUBSTANCE GRANULATING APPARATUS LOADED ON A VEHICLE

BACKGROUND OF THE INVENTION

1. Field of the invention

The present invention relates to a solid substance granulating apparatus loaded on a vehicle, which is able to treat inorganic solid substances, that is, is able to move to various places such as places where incombustibles are collected, sightseeing places, etc. to crush inorganic solid substances such as glass products, chinaware, bricks, etc., to granulate crushed substances by removing sharp edges of the crushed substances, to screen crushed substances to various kinds of grain sizes.

2. Prior Arts

Recently, treatment of inorganic substances such as incombustibles has been a problem due to an increase of glass products and products made of chinaware, bricks, etc.

Conventionally, after inorganic solid substances such as glass products, chinaware, bricks, etc. are collected at a predetermined place, a collecting vehicle collects, and conveys the same to a treatment facility which is provided with apparatuses for crushing, granulating and screening, etc. of those inorganic solid substances, wherein they are finally treated.

It is expensive and time consuming to convey inorganic solid substances such as glass products, etc. of glass bottles, etc. to a treatment facility. Therefore, the inorganic solid substances are infrequently gathered by a collecting vehicle. A problem arises where the collection and treatment capacity of inorganic solid substances such as glass products, chinaware, bricks, etc. does not catch up with the quantity of discharged solid substances.

Furthermore, such a problem exists, where the collected inorganic solid substances are very bulky compared to the transpotation means. In such a situation, the transpotation are efficiency declines, and a great deal of inorganic solid substances can not be transported at a time.

Therefore, a transportable type glass crushing system was developed. The transpotation system included, on the deck of a vehicle such as a truck, a glass crushing machine, a charging device for charging glass products such as glass bottles, etc. into a charging port of the glass crushing machine, a transfer device connected to the lower part of the glass crushing machine in order to transfer crushed substances crushed by the glass crushing machine, a grain size screening device for screening and classifying the crushed substances to grain sizes, and a dust collector connected to the glass crushing machine.

However, in the abovementioned glass crushing machine, there are still the following shortcomings:

It is difficult to re-use crushed inorganic solid substances because sharp edges of the crushed substances may injure workers' hands when treating the crushed substances.

Furthermore, in order to re-use crushed substances, it is necessary to transport the collected crushed inorganic solid substances to a treatment facility which has a granulating apparatus for removing sharp edges of crushed substances and granulating the same, whereby the working efficiency after the crushing treatment is poor, the working environments of workers may be worsened due to dust and dirt generated in the process of granulating the crushed substances to cause the sanitary condition to be worsened.

SUMMARY OF THE INVENTION AND ADVANTAGES THEREOF

The invention was developed to solve the abovementioned conventional shortcomings, and it is an object of the invention to provide a solid substance granulating apparatus loaded on a vehicle, which is able to move to a place of collection of inorganic solid substances such as glass products, chinaware, salt silicate minerals, etc. of tourmaline, etc., to crush and treat those inorganic solid substances, to automatically granulate in order to eliminate sharp edges, to screen the same, and to turn the same into recycled products, wherein the treatment efficiency of inorganic solid substances is excellent and the sanitary condition of the treatment work, etc. can be secured.

In order to achieve the above objectives, a solid substance granulating apparatus according to the invention includes a vehicle, a crushing machine installed at the rear side of the deck of the vehicle, a charging device for charging inorganic solid substances into the crushing machine, a crushed substance transfer device connected to a crushed substance discharge portion of the crushing machine in order to transfer the crushed substance, and a screening device for screening and classifying the crushed substances to various kinds of grain sizes, the same comprises a granulating apparatus having a drum rotatably disposed at the downstream side of the crushed substance transfer device, a reception portion installed at the upstream side of the drum in order to receive crushed substances discharged from the crushed substance transfer device, a granulating means consisting of kick-back impellers interspersed at an appointed interval on the inner circumferential surface of the drum, a discharge port disposed at the other end of the drum, a supporting portion for supporting the drum, and a drive portion for driving and rotating the drum; and a granulated substance transfer device connected to the discharge portion of the granulating apparatus in order to transfer granulated substances into the screening device.

With this construction, it is possible for a solid substance granulating apparatus to move to a collection place of inorganic solid substances, including isolated islands and sightseeing places, and to crush inorganic solid substances at various places. Furthermore, by a granulating apparatus thereof, it is possible to thoroughly granulate the solid substances in order to remove edges of crushed substances. Since it is possible to remove sharp edges of the crushed substances, it is possible to prevent workers' hands, etc. from being injured, and it is possible to prevent transfer vessels from being scratched by the sharp edges of crushed substances when transferring the same. The granulated substances can be screened and classified by a screening device according to grain sizes, etc., and the recycling thereof can be easily facilitated. That is, inorganic solid substances can be fully automatically crushed and granulated on a vehicle, whereby the working efficiency of collection work of glass bottles, etc. can be improved.

As described above, according to the solid substance granulating apparatus loaded on a vehicle according to the invention, the following excellent effects can be achieved.

Since a crushing machine, and a granulating apparatus, a screening device are installed on the deck of a vehicle, they can be moved to any collection place of incombustibles, and crushing, granulating and screening treatments of inorganic solid substances such as glass bottles can be fully automatically carried out on the deck of a vehicle and the operation thereof can be continuously performed. A great deal of inorganic solid substances can be treated in a short time. That is, the treatment efficiency of inorganic solid substances is excellent.

Since the drum of the granulating apparatus is provided with kick-back impellers at appointed positions on the inner circumferential wall, the crushed substances are brought into collision with the kick-back impellers by only causing the drum to rotate and simultaneously they are brought into collision with each other to facilitate the granulating treatment. Therefore, it is easy to granulate crushed substances of inorganic solid substances.

Since the drum of the granulating apparatus is disposed with an inclination angle of 0° to 20° with the charging port made higher than the discharge port, inorganic solid substances can be automatically discharged by only rotating the drum while granulating the inorganic solid substances, wherein the discharge efficiency of granulated substances is excellent.

Since the kick-back impellers, which are formed with 20° to 80° with respect to the axial line of the drum at a height of 1/20 to 1/3 the diameter of the drum, are provided on the inner circumferential surface of the drum of the granulating apparatus, crushed substances are brought into collision with the kick-back impellers and they are caused to stay in the drum, whereby the granulating treatment can be carried out to such a degree that a worker does not feel edges when touching them. It is possible to prevent any accident, where workers' hands are injured in the treatment work, from occurring. Therefore, the safety can be improved in the operation.

Since a paper, etc. separating device is equipped at the downstream side of the granulated substance transfer device, paper, etc. mixed in the granulated substances can be blown off by applying the jet air from the air jetting portion to the granulated substances charged through the granulated substance charging port of the paper, etc. separating device. The paper, etc. removed by a dust collector can be collected, and it is possible to make compact and collect granulated substances of inorganic solid substances. The storage efficiency can be improved after the granulating treatment.

Since granulated substances can be collected after being screened by a screening device according to the grains sizes, the treatment efficiency of the granulated substances can be improved after the collection.

Since a dust collector is also secured on the deck, it is possible to prevent dust and dirt resulting from the crushing operation from being scattered. The working environment can be improved.

Since an upward turnable wing type deck cover is provided on the deck, one side or both sides of the deck can be opened, whereby the installation and maintenance the respective devices can be easily carried out, and the work efficiency is excellent.

BRIEF DESCRIPTION OF THE DRAWINGS

The above and other advantages of the invention will become more apparent from the following description taken in conjunction with the accompanying drawings, wherein.

DESCRIPTION OF PREFERRED EMBODIMENT

A solid substance granulating apparatus includes a vehicle vehicle such as a truck, etc.; a crushing machine installed at the rear side of the deck of the vehicle; a charging device for charging inorganic solid substances such as glass products and chinaware, etc. into the crushing machine; a crushed substance transfer device connected to a crushed substance discharge portion of the crushing machine and used for transferring the crushed substance; and a screening device for screening and classifying the crushed substances to various kinds of grain sizes; and which further comprises a granulating apparatus having a drum rotatably disposed at the downstream side of the crushed substance transfer device; a reception portion disposed at the upstream side of the drum in order to receive crushed substances discharged from the crushed substance transfer device; kick-back impellers interspersed at an appointed interval on the inner circumferential surface of the drum; a discharge port disposed at the other end of the drum; a supporting portion for supporting the drum; and a drive portion for driving and rotating the drum, and a granulated substance transfer device connected to the discharge portion of the granulating apparatus in order to transfer granulated substances into the screening device.

Thereby, it is possible for the solid substance granulating apparatus to move to any optional place, to crush inorganic solid substances such as glass products, and to carry out a granulating treatment for removing sharp edges of crushed substances, and further it is possible for its screening device to screen and classify the granulated substances according to grain sizes. That is, the solid substance granulating apparatus has an action by which crushing and granulation of inorganic solid substances can be automatically carried out on a deck of a vehicle.

Furthermore, since the solid substance granulating apparatus is provided with kick-back impellers interspersed at an appointed interval on the inner circumferential wall of the drum thereof, the crushed substances charged in the drum which are driven and rotated are brought into collision with the kick-back impellers to cause the crushed substances to be brought into collision with each other while being pushed back to the charging port of the drum. Therefore, it is possible to granulate the crushed substances by removing their sharp edges.

Herein, the drum of the granulating apparatus is made of materials of excellent mechanical strength such as wear-resisting steel plate, and further in a case where the inner circumferential wall of the drum is lined with rubber or ceramic is flame-sprayed thereon, it is possible to prevent the inner circumferential wall from being worn due to crushed substances, thereby causing the durability of the drum to be increased. Furthermore, in a case where an anti-noise material is provided for the outer circumferential wall of the drum, it is possible to prevent noise from being generated when carrying out a granulating treatment of crushed substances. Foamed resin or foamed rubber may be preferably used as an anti-noise material.

In a case where a metallic bar-like member or one to which ceramic is flame-sprayed is disposed onto the inner circumferential wall of the drum in parallel to the axial direction of a drum, the crushed substances are prevented from slipping along the inner circumferential wall of the drum. The number of times of collision is increased to cause the granulation treatment efficiency of crushed substances to be improved. Furthermore, in a case where a solid bar, a hollow bar, etc. are disposed on the inner circumferential wall of the drum orthogonally to the axial direction of the drum, the surface of collision of crushed substances in the drum can be increased, and the granulation efficiency of crushed substances can be improved.

Still furthermore, in a case where guide impellers (feeding impellers) which guide crushed substances to the discharge port side of the drum are provided at the charging port side of the drum in addition to the kick-back impellers, it is possible to prevent crushed substances from being accumulated in the vicinity of the charging portion of the drum, and the flow of crushed substances for granulation treatment can be improved.

It is better that in order to install the crushing machine on the deck of a vehicle, the dimensions such as height, width, etc. thereof are small, and the weight thereof is light. Preferably, a crushing machine which the present applicant previously filed for patent and which is provided with a crushing roller having crushing elements on its outer circumferential surface in its cylindrical crushing chamber may be used.

A charging device may be a conveyor such as a bucket type conveyor which is able to vertically move and charge inorganic solid substances such as glass bottles, etc. while turning at an appointed degree of angle at the solid substance charging port of the crushing machine, a conveyor having a belt with crosspieces, a pivot type conveyor having rotatable buckets, or other bucket type conveyor having buckets.

As a crushed substance transfer device and a granulated substance transfer device, a conveyor having a belt with crosspieces, a screw type conveyor can be preferably used.

A solid substance granulating apparatus loaded on a vehicle according to the invention is constructed so that the drum of the granulated substance has an inclination angular portion of 0° to 20°, preferably 2° to 15°, and the charging port side of the drum is disposed higher than the discharge port side of the drum.

Thereby, by only turning the drum, it is possible to transfer granulated substances to the discharge port side of the drum and to discharge the same from the granulating apparatus while granulating the crushed substances in the drum of the granulating apparatus.

Herein, it is preferable that the inclination angle of the drum is 2° to 6° when crushing glass products such as glass bottles, etc., 2° to 8° when crushing chinaware, etc., and 2° to 12° when crushing tourmaline. If the inclination angle of the drum is less than 0°, granulated substances can not be automatically discharged from the drum, and if the inclination angle of the drum exceeds 20°, the crushed substances in the drum are hardly accumulated in the drum and are not sufficiently granulated. Either case is unfavorable.

Furthermore, in a case where a granulating apparatus is vertically movably installed and the height adjusting portion is disposed at one end portion, it is possible to optionally change the inclination angle of the drum according to the kinds of crushed substances and degree of granulation.

Furthermore, in a case where the discharge side of the drum is formed to be tapered, it is possible to accumulate the crushed substances in the drum, whereby the granulated substances are further brought into collision with each other and are gradually discharged while further granulating the same.

A solid substance granulating apparatus loaded on a vehicle according to the invention is also constructed so that the kick-back impellers of the granulating apparatus is formed so as to have a height of $\frac{1}{20}$ to $\frac{1}{3}$ times, preferably $\frac{1}{10}$ to $\frac{1}{4}$ times, the diameter of the drum, and are disposed at an inclination angle of 20° to 80°, preferably 45° to 70° with respect to the axial line of the drum.

Thereby, the crushed substances charged in the drum of the granulating apparatus are brought into collision with the kick-back impellers, and they are accumulated in the drum by the damming effect thereof to cause the crushed substances to be repeatedly brought into collision with each other. Therefore, sharp edges of the crushed substances are removed to such a degree that no sharp edges are felt even the crushed substances are touched, wherein the crushed substances can be granulated.

Furthermore, there is a tendency where it becomes difficult to obtain the damming effect if the height of the kick-back impellers becomes smaller than one-tenth of the diameter of the drum of the granulating apparatus. Furthermore, if the height of the impellers becomes bigger than one-fourth thereof, the damming effect is made too strong, whereby the accumulation time of the crushed substances in the drum is made longer, and the discharge treatment capacity of granulated substances may be spoiled. Either case is not favorable.

Still furthermore, if the inclination angle of the kick-back impeller is made smaller than 45° with respect to the axial direction of the drum, it will becomes difficult to obtain the damming effect thereof, and further if the inclination angle exceeds 70°, the damming effect is made too strong, whereby the accumulation time thereof in the drum is made longer to cause a tendency of powdering to appear. Either case is not favorable. Furthermore, kick-back impellers having different inclination angles may be installed on the inner circumferential wall of the drum. Thereby, the crushed substances are prevented from wake flows of the rotations of the drum to cause the number of times of collisions to be increased.

A solid substance granulating apparatus loaded on a vehicle according to the invention is constructed so that the same is further provided with a granulated substance charging port into which the granulated substances are charged; an air jetting portion formed to be like a slit in the direction orthogonal to the granulated substance charging port; a paper etc. discharge port formed, at the face opposite the air jetting portion, to be opened greater than said air jetting portion; and a granulated product take-out port formed on the bottom surface; and comprising a paper, etc. separating device disposed at the downstream side of the granulated substance transfer device; and a blower for feeding air to the air jetting portion.

Thereby, air is applied from the air jetting portion to the crushed substances granulated through the granulated substance charging port, whereby it is possible to remove paper, etc. adhered to the granulated substances to be blown off.

Herein, the air jetting portion may be formed by drilling a plurality of pores instead of forming the same so as to be like a slit. Furthermore, in a case where the jetting rate of air supplied by a blower is high, the air jetting portion is not formed to be like a slit, but an opening may be formed instead.

Further, a reception plate which receives granulated substances may be disposed, although being downward of the granulated substance charging port, at almost the same height as that of the air jetting portion or at a little upward position thereof. Since it is possible to widen the contact area of the granulated substances dropped onto the reception plate with the jetting air and to lengthen the contacting time thereof, paper wastes, etc. may be blown away, and the reception plate is disposed upwards of the air jetting portion and the reception plate is vibrated as necessary, whereby the granulated substances from which paper, etc. is removed is dropped from the reception plate for separation of paper, etc.

A solid substance granulating apparatus loaded on a vehicle according to the invention is constructed so as to further comprise a dust suction port formed at the top plate or at the upper part of the side plate of the crushing machine, a suction tube connected to the paper, etc. discharge port of the paper, etc. separating device; and a dust collector connected to the suction tube in order to collect dust and paper, etc.

Thereby, it is possible to prevent dust and dirt from being scattered on the deck of a vehicle when crushing inorganic solid substances and to prevent paper, etc. from being spattered thereon when separating paper, etc. Therefore, it is also possible to prevent the working environment from being worsened when crushing inorganic solid substances and/or collecting them.

Herein, a dust collector may be of a filtering cloth type or a cyclone type, etc.

A solid substance granulating apparatus loaded on a vehicle according to the invention is constructed so as to comprises a frame member disposed on the deck, a cover reception portion disposed at the upper part of the frame member in parallel to the advancing direction of the vehicle; and a wing type deck cover swingably disposed at the cover reception portion.

Thereby, the deck cover can be turned upwards and opened, it is possible to perform maintenance of the respective devices installed on the deck, and simultaneously since the deck cover is formed of a wing type which can be opened upwards, the respective devices can be prevented from rain drops, etc. by the deck cover even when the deck cover is opened.

Herein, the deck cover may be a wing type which can turn only one-side portion of the deck upward or may be formed of a double-side wing type which can open both the sides of the deck.

Hereinafter, a description will be given of a solid substance granulating apparatus loaded on a vehicle according to a preferred embodiment, with reference to the accompanying drawings.

Figure 1:
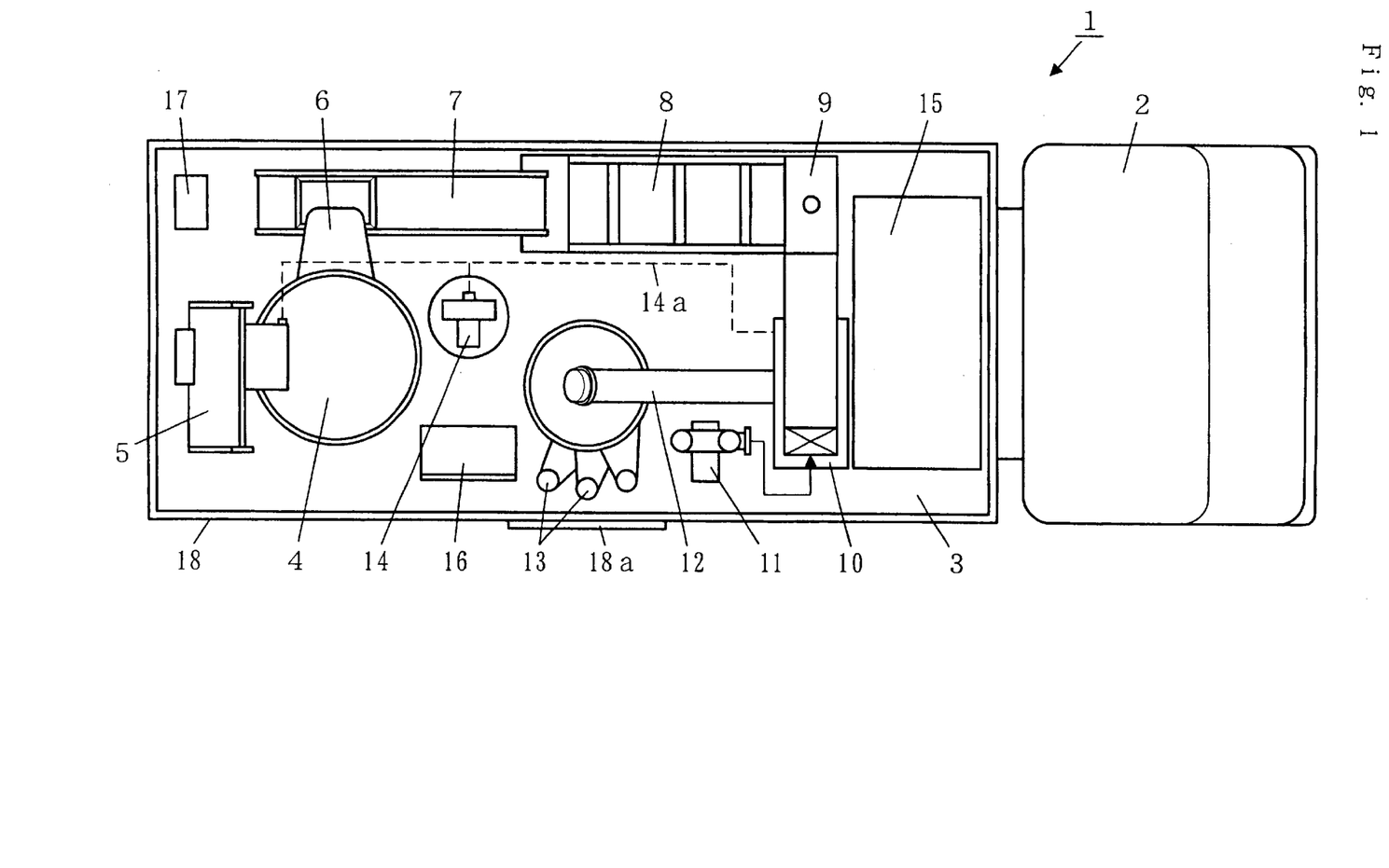
FIG. 1 is a plan view of a solid substance granulating apparatus loaded on a vehicle according to a preferred embodiment.
Figure 2:
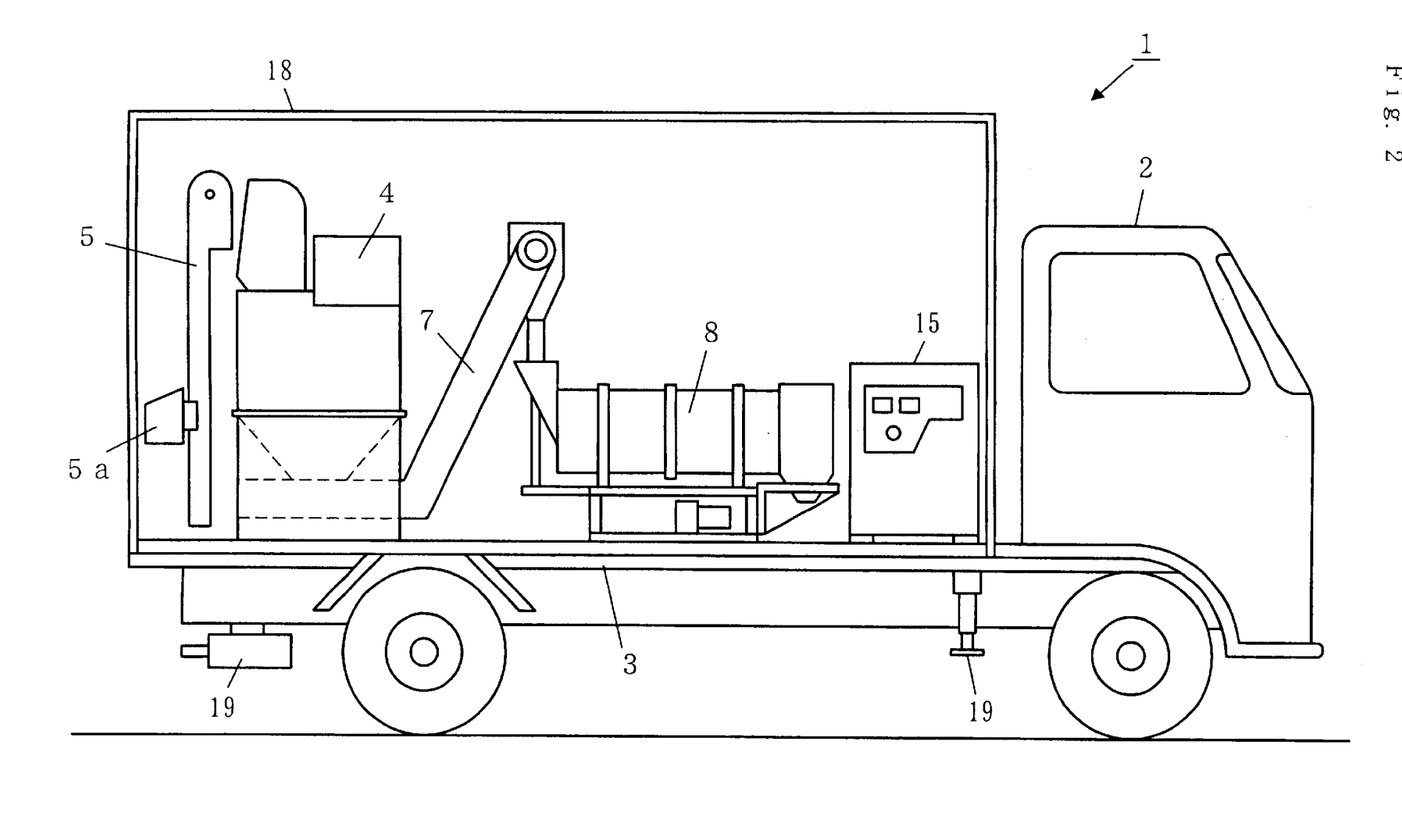
FIG. 2 is a side elevational view of major parts of a solid substance granulating apparatus loaded on a vehicle according to the preferred embodiment.
Figure 3:
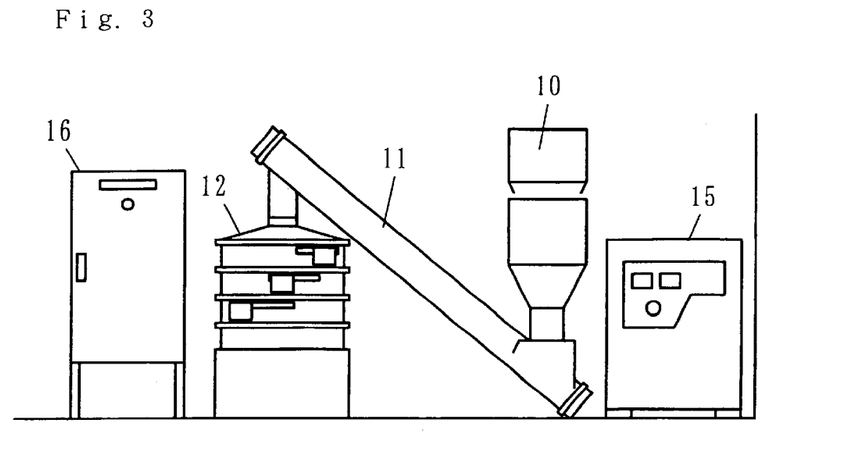
FIG. 3 is a side elevational view of major parts at the screening device side according to the preferred embodiment.
Figure 4:
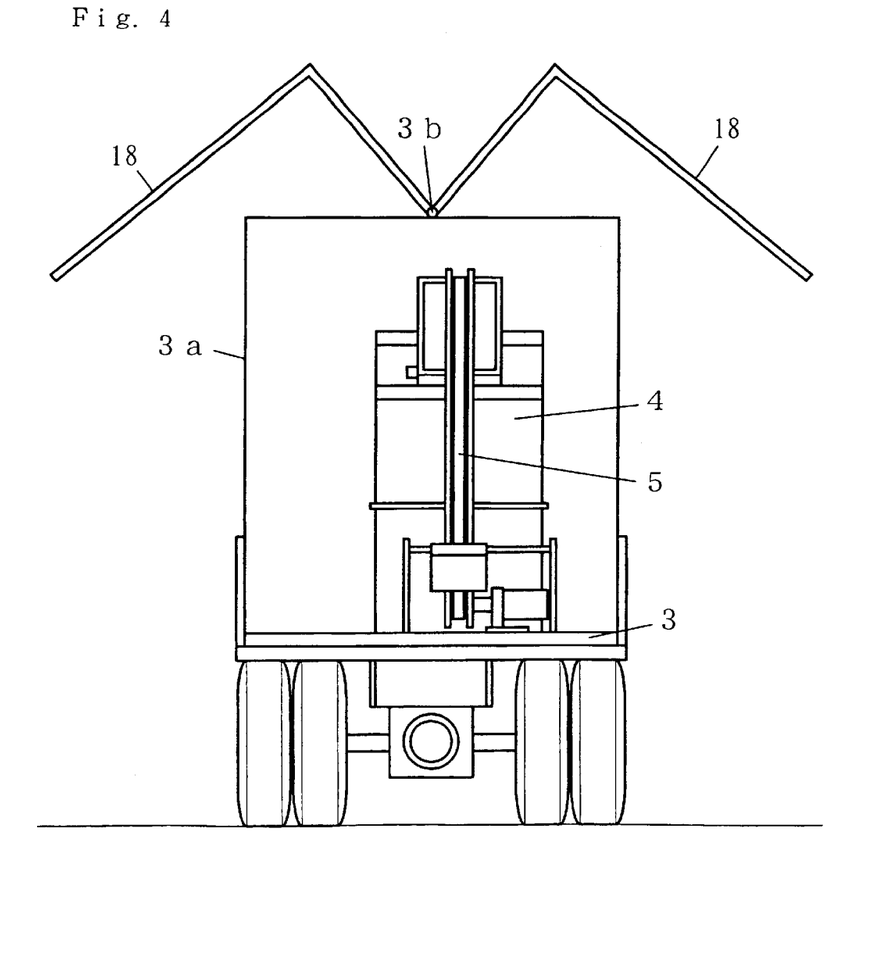
FIG. 4 is a side elevational view of major parts at the rear parts of a solid substance granulating apparatus loaded on a vehicle according to the preferred embodiment.

FIG. 1 is a plan view of a solid substance granulating apparatus loaded on a vehicle according to the preferred embodiment, FIG. 2 is a side elevational view of major parts of a solid substance granulating apparatus loaded on a vehicle according to the preferred embodiment, FIG. 3 is a side elevational view of major parts at the screening device side of the preferred embodiment, and FIG. 4 is a side elevational view of major parts at the rear part side of a solid substance granulating apparatus loaded on a vehicle according to the preferred embodiment.

In the drawings, 1 is a solid substance granulating apparatus loaded on a vehicle according to the preferred embodiment. 2 is a vehicle. 3 is a deck of the vehicle 2 on which the respective devices are installed. 4 is a crushing machine installed at the rear part side of the deck 3. 5 is a charging device connected to a charging port of solid substances of the crushing machine 4, which vertically moves and turns to an appointed degree of angle at the charging port of solid substances of the crushing machine 4 and has buckets for charging solid substances into the crushing machine 4. 6 is a crushed substance discharge device connected to the discharge port of the crushing machine 4 and consisting of a conveyor having a belt with crosspieces. 7 is a crushed substance transfer device connected to the crushed substance discharge device 6 and consisting of a conveyor having a belt with crosspieces to transfer crushed substances crushed by the crushing machine 4. 8 is a granulating apparatus, the reception portion of which is connected to the crushed substance transfer device 7. 9 is a granulated substance transfer device connected to the discharge port of the granulating apparatus 8 and consisting of a conveyor having a belt with crosspieces to transfer granulated substances granulated by the granulating apparatus 8. 10 is a paper, etc. separating device disposed at the downstream side of the granulated substance transfer device 9. 11 is a blower connected to the air jetting port of the paper, etc. separating device 10. 12 is a granulated product transfer device connected to the take-out port of granulated products of the paper, etc. separating device 10 and consisting of a screw type conveyor for transferring the granulated products from which paper etc., is separated in the paper, etc. separating device 10. 13 is a screening device connected to the granulated product transfer device 12, which is able to screen and classify the grain sizes of the granulated products. 14 is a dust collector connected to the dust suction port formed at the upper part of the side wall of the crushing machine 4 and to the paper, etc. discharge port of the paper, etc. separating device 10. 14a is a suction tube for connecting the dust collector 14 to the dust suction port of the crushing machine 4 and to the paper, etc. discharge port of the paper, etc. separating device 10. 15 is a power generating device of the respective devices, which is installed on the deck 3. 16 is a control unit of the respective devices, 17 is an operation panel of the respective devices, 18 is an upward swingable wing-type deck cover which is disposed upward of the deck 3 and covers up the respective devices. 18a is a door portion formed at the deck cover 18 at the side portion of the screening device 13. 19 is a vehicle fixing portion disposed downward of the deck 3.

Furthermore, the crushing machine 4 is such that a crushing roller having crushing elements on the outer circumferential surface thereof is equipped in a cylindrical crushing chamber. The same is preferable in that the crushing treatment capacity is excellent, the sizes thereof such as height, width, etc. are small and the weight thereof is light.

Furthermore, as the crushed substance discharge device 6, a screw type conveyor may be employed instead of a conveyor having a belt with crosspieces.

Still furthermore, as the granulated product transfer device 12, a conveyor having a belt with crosspieces may be employed instead of a screw type conveyor.

Figure 5:
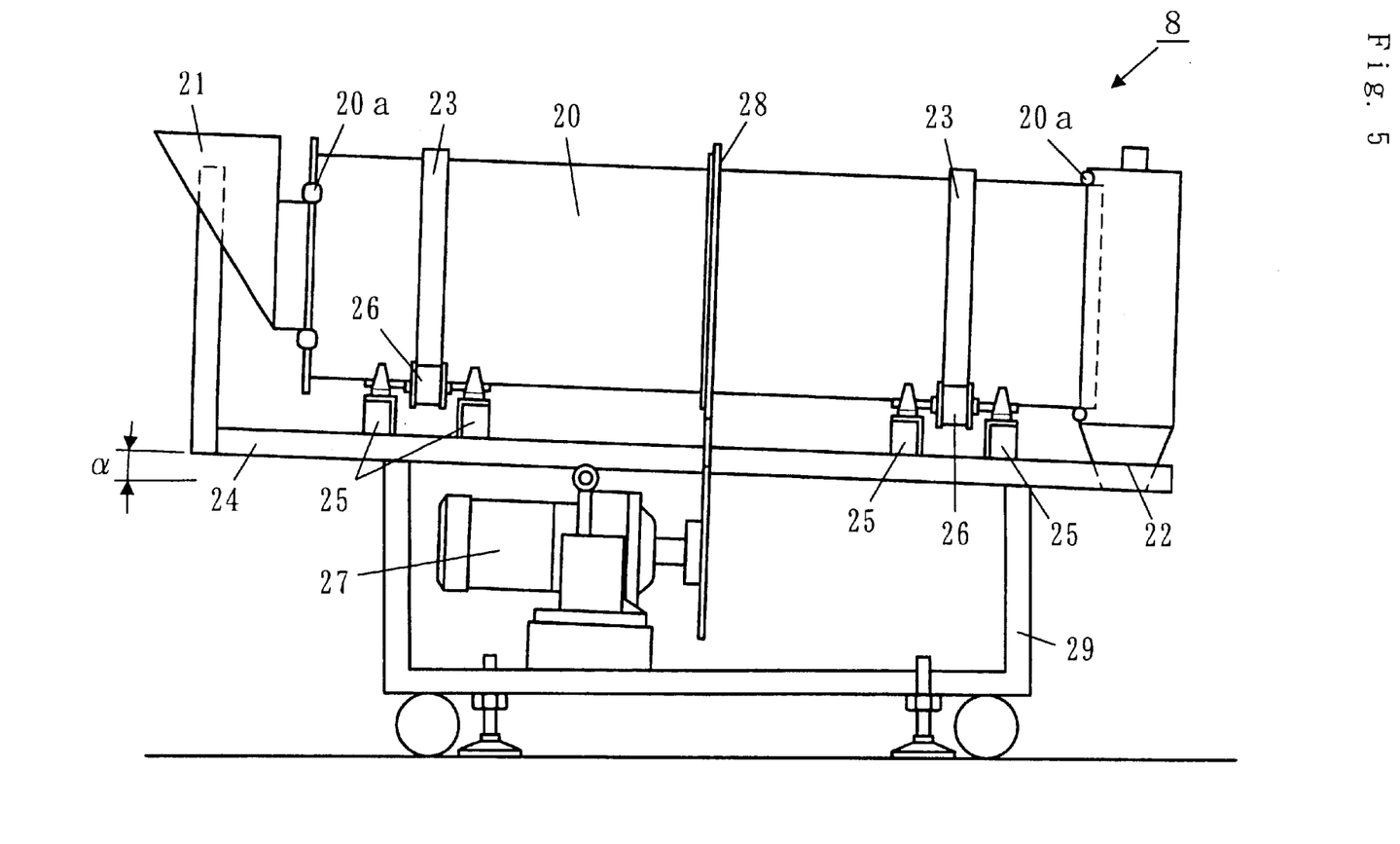
FIG. 5 is a side elevational view of major parts of a granulating apparatus according to the preferred embodiment.
Figure 6A:
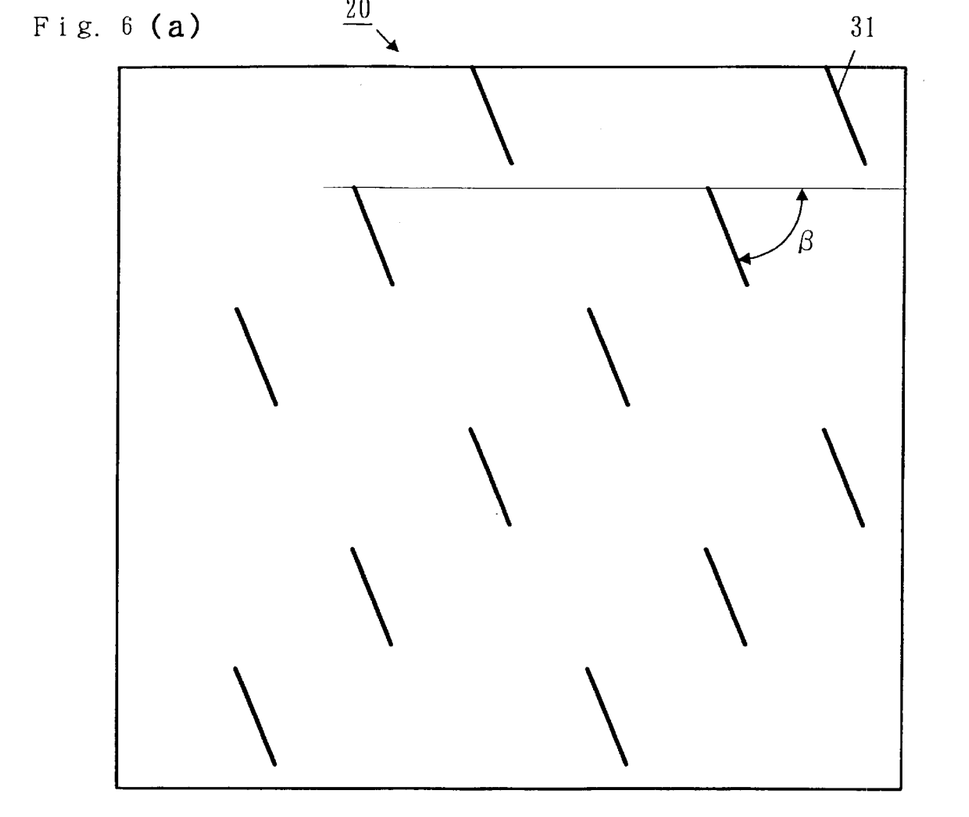
FIG. 6(a) is a developed view of a drum of the granulating apparatus according to the preferred embodiment.
Figure 6B:
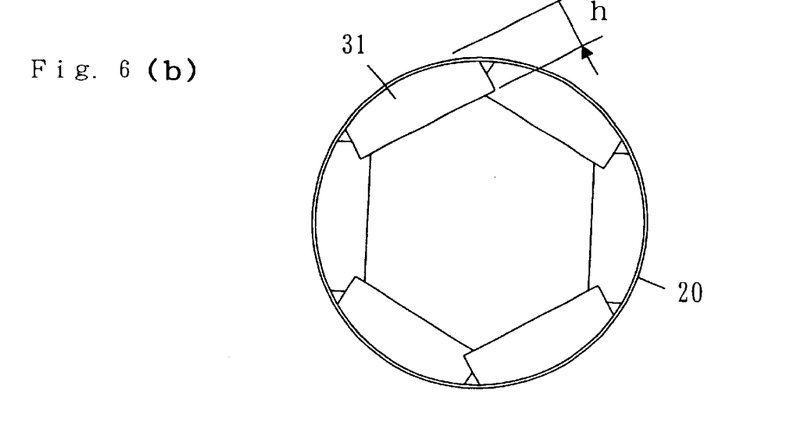
FIG. 6(b) is a cross-sectional view of major parts of the drum of the granulating apparatus according to the preferred embodiment.

Next, a granulating apparatus according to the preferred embodiment is described with reference to the drawings, wherein FIG. 5 is a side elevational view of major parts of the granulating apparatus of the preferred embodiment, FIG. 6(*a*) is a developed view of the drum of the granulating apparatus according to the preferred embodiment, and FIG. 6(*b*) is a cross-sectional view of major parts of the drum of the granulating apparatus according to the preferred embodiment.

20 is a drum of the granulating apparatus 8 made of wear-resisting steel plate. 20a is a reception portion or a ceiling portion to which the discharge port is connected. 21 is a reception portion, the upper surface of which is open, connected to the crushed substance transfer device 7 and the drum 20. 22 is a discharge port, the lower surface of which is open, connected to the granulated substance transfer device 9 and the drum 20. 23 is a rail portion disposed at an appointed position of the outer circumference of the drum 20. 24 is a drum disposed portion where the drum 20 is arranged on its upper surface and the reception portion 21 side of the drum 20 is inclined higher than the discharge port 22 side. 25 is a supporting portion for supporting the rotations of the drum 20 disposed at the drum disposed portion 24. 26 is a rotating roller pivotally supported at the supporting portion 25 and rotating in contact with the rail portion 23 of the drum 20. 27 is a drive portion disposed downward of the drum disposed portion 24, which drives and rotates the drum 20. 28 is a drive transmission portion applied to the outer circumference of the drum 20 and consisting of a chain or a belt driven by the drive portion 27. 29 is a leg portion disposed on the lower surface of the drum disposed portion 24. 30 is a height adjusting portion disposed at the leg portion 29 and consisting of adjuster, etc. which adjusts the inclination angle of the drum disposed portion 24. 30a is a wheel consisting of caster disposed at the leg portion 29. 31 is an kick-back impeller formed at an appointed position of the inner circumferential wall of the drum 20 of the granulating apparatus 8. $\alpha$ is an inclination angle of the granulating apparatus 8, $\beta$ is an inclination angle of the kick-back impeller 31 with respect to the axial line of the drum 20, h is a height of the kick-back impeller 31.

Furthermore, the inclination angle $\alpha$ of the drum 20 is formed to be 2°.

The inclination angle $\beta$ of the kick-back impellers 31 is formed to be 70°, and the height h of the kick-back impellers 31 is formed to be one-sixth the diameter of the drum 20.

Furthermore, the drum 20 is preferably such that a rubber lining is given to the inner circumferential wall thereof, and ceramic is flame-sprayed to the inner circumferential wall thereof. Thereby, it is possible to prevent the inner circumferential wall of the drum 20 from being worn due to crushed substances, and the durability thereof can be further improved.

Furthermore, in a case where an anti-noise material is disposed on the outer circumferential wall of the drum 20, it is possible to prevent noise which is generated when driving the granulating apparatus 8.

Furthermore, guide impellers (feeding impellers) which are able to guide crushed substances charged from the reception portion 21 to the discharge port 22 side of the drum 20 may be disposed on the inner circumferential wall at the reception portion 21 side of the drum 20 in addition to the kick-back impellers 31. It is possible to prevent the crushed substances charged in the vicinity of the reception portion 21 from being accumulated there.

Still furthermore, solid or hollow bars made of iron, etc. nay be provided on the inner circumferential wall of the drum 20 in parallel to and/or orthogonally to the axial line. By solid or hollow bars which are disposed in parallel to the axial line, it is possible to prevent the crushed substances from slipping along the inner circumferential wall of the drum 20, and by solid or hollow bars which are disposed orthogonally to the axial line, the collision area of the crushed substances can be increased to cause the granulation efficiency of the crushed substances to be improved.

Figure 7:
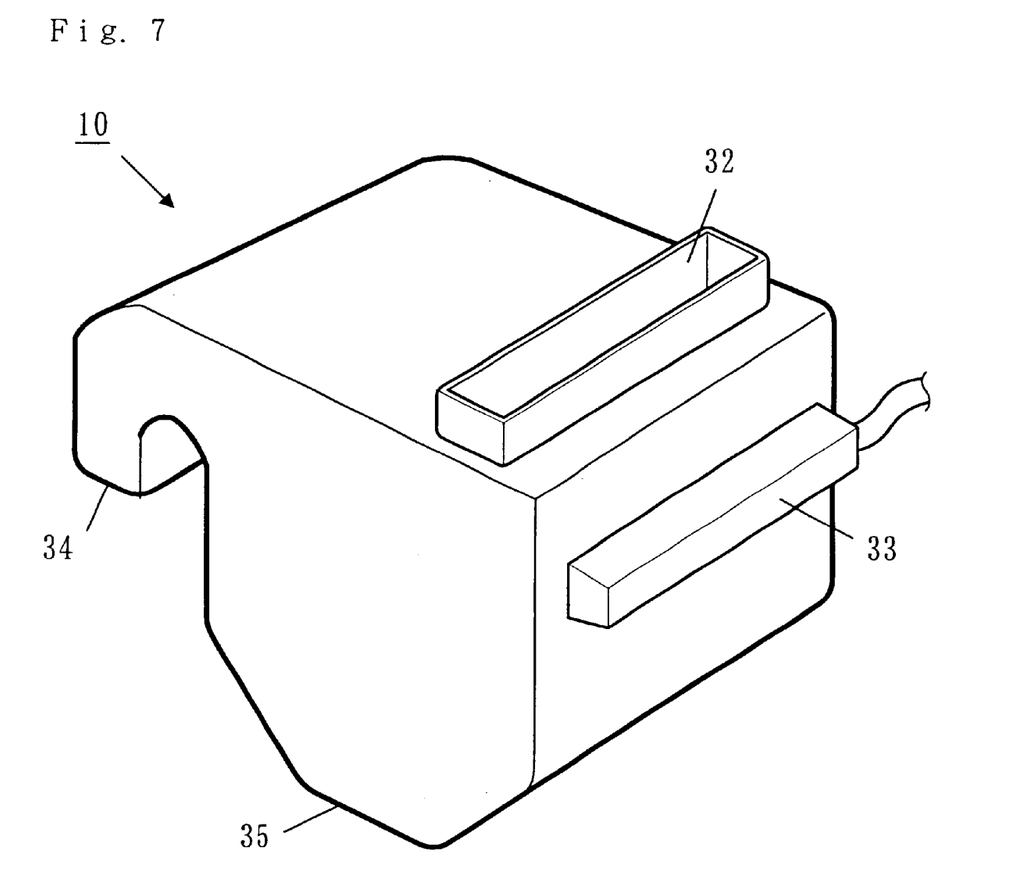
FIG. 7 is a perspective view of major parts of a paper, etc. separating device according to the preferred embodiment.

Next, a description will be given of a paper, etc. separating device according to the preferred embodiment with reference to a drawing.

FIG. 7 is a perspective view of major parts of a paper, etc. separating device according to the preferred embodiment.

32 is a granulated substance charging port formed on the upper surface of the paper, etc. separating device 10 and communicating with the downstream side of the granulated substance transfer device 9. 33 is an air jetting portion formed to be like a slit at the rear side of the paper, etc. separating device 10 and connected to the blower 11. 34 is a paper, etc. discharge port formed to be opened greater than the air jetting portion 33 at the face opposite to the air jetting portion 33 and connected to the dust collector 14 by the suction tube 14a. 35 is a granulated product take-out port open at the bottom of the paper, etc. separating device 10.

In a solid substance granulating apparatus loaded on a vehicle, which is constructed as described above, the actions for treating solid substances are described below.

The solid substance granulating apparatus loaded on a vehicle is moved to a collection place, etc. of inorganic substances such as glass bottles and the vehicle 2 of which is fixed by the vehicle fixing portions 19. Solid substances such as bottles collected from buckets 5a of the charging device 5 can be charged into the solid substance charging port of a crushing machine 4, and the charging device 5 is drawn out and is set at a position where a worker can put the collected solid substances in buckets 5a.

Next, inorganic solid substances such as glass bottles to be crushed are put in the buckets 5a of the charging device 5, and the buckets 5a are vertically moved. The buckets 5a are turned an appointed angle at the solid substance charging port of the crushing machine 4, whereby the inorganic solid substances are charged in the crushing machine 4 and thereby crushed. After inorganic solid substances are crushed in the crushing machine 4, the crushed substances are delivered onto a belt conveyor, with crosspieces, of the crushed substance transfer device 7 by the crushed substance discharge device 6 connected to the discharge portion of the crushing machine 4. Furthermore, the crushed substances are transferred to the reception portion 21 of the granulating apparatus 8 by the crushed substance transfer device 7 and are charged into the drum 20 of the granulating apparatus 8.

In the granulating apparatus 8, the drive portion 27 thereof drives a chain, etc. of the drive transmission portion 28 applied to the outer periphery of the drum 20 and the drum 20 is driven and rotated while supporting the drum 20 by the rail portion 23 disposed at the outer circumference of the drum 20 and the rotating roller 26 pivotally supported at the supporting portion 25. The edges of the crushed substances charged in the drum 20 are removed by being brought into collision with each other in the rotating drum 20, and they are brought into collision with the kick-back impellers 31 disposed at appointed positions on the inner circumferential wall of the drum 20 and are pushed back the reception portion 21 side of the granulating apparatus 8, wherein the edges of crushed substances are removed by being brought into collision with each other to cause then to be made grains having no sharp edges. Thereafter, the granulated substances are gradually transferred to the discharge port 22.

Next, the granulated substances are discharged onto a belt, with crosspieces, of the granulated substance transfer device 9 connected to the discharge port 22 of the granulating apparatus 8 and are caused to fall down from the granulated substance charging port 32 formed on the upper surface of the paper, etc. separating device 10 connected to the downstream side of the granulated substance transfer device 9 into the paper, etc. separating device 10. The paper, etc. separating device 10 jets air from the air jetting portion 33 connected to the blower 11 and applies the jet air to the granulated substances charged and falling down from the granulated substance charging port 32, whereby paper, etc. mixed in the granulated substances are blown off, the paper, etc. are discharged from the paper, etc. discharge port 34 formed at the face opposite to the air jetting portion 33 and are collected by the dust collector 14 connected to the paper, etc. discharge port 34. Thereafter, the granulated products from which paper, etc. are separated are discharged through the granulated product take-out port 35.

Next, the granulated products, from which paper, etc. are separated by the paper, etc. separating device 10 and are discharged by the granulated product take-out port 35 are transferred into the granulated product transfer device 12 consisting of a screw type conveyor and transferred to the screening device 13 connected to the granulated product transfer device 12, and they are screened and classified by the screening device 13 according to the grain sizes.

Furthermore, the respective devices are controlled by the control unit 16, whereby the treatment operation can be automatically carried out. Furthermore, the operation of the respective devices can be carried out by the operation panel 17.

A solid substance granulating apparatus loaded on a vehicle according to the preferred embodiment is constructed as described above, and the same has the following actions.

Since the respective devices such as a crushing machine, a granulating apparatus, screening device, etc. are installed on the deck of a vehicle, they can be moved to any optional place, where crushing of inorganic solid substances such as glass products, etc., granulating thereof, screening of the grain sizes of granulated substances, etc. can be automatically carried out on the vehicle, and the operation can be continuously controlled.

Since the granulating apparatus is provided with the kick-back impellers on the inner circumferential wall of the driven and rotating drum thereof, the crushed substances transferred in the drum are brought into collision with the kick-back impellers and pushed back to the reception portion side of the granulating apparatus. Furthermore, the crushed substances are brought into collision with each other in the drum in order to facilitate the granulation. The kick-back impellers of the granulating apparatus are constructed so that the height thereof is made one-sixth the diameter of the drum and has an inclination angle of 70° with respect to the axial line of the drum, the crushed substances charged in the drum can be sufficiently granulated by staying in the drum for an appointed duration of time to such a degree that none feels any edge when touching the crushed substances with hands.

Since a paper, etc. separating device is equipped at the downstream side of the granulated substance transfer device, it is possible to remove paper, etc. mixed in the granulated substances by blowing off, and since a dust collector is connected to the paper, etc. discharge port of the paper, etc. separating device, the removed paper, etc. can be effectively collected by the dust collector.

Since a wing-type deck cover which is turnable upwards is equipped on the deck, the side of the deck can be opened, whereby it is easy to carry out installation and maintenance of the respective devices, and simultaneously since the door portion is secured at the deck cover at the side portion of the screening device, it is easy to discharge the screened granulated products.

What is claimed is:

1. A solid substance granulating apparatus loaded on a vehicle, said solid substance granulating apparatus comprising:

a crushing machine, for crushing a solid substance to form a crushed substance, said crushing machine having a crushed substance discharge portion;

a charging device for charging said solid substance into said crushing machine;

a crushed substance transfer device, for transferring said crushed substance, connected to said crushed substance discharge portion of said crushing machine;

a screening device for screening said crushed substances based on grain size;

a granulating apparatus having (1) a drum rotatably disposed at a downstream side of said crushed substance transfer device, (2) a reception portion installed at an upstream end of said drum to receive said crushed substance discharged from said crushed substance transfer device, (3) a plurality of kick-back impellers provided on an inner circumferential surface of said drum, (4) a discharge portion disposed at a downstream end of said drum, (5) a supporting portion for rotatably supporting said drum, and (6) a drive portion for rotating said drum; and a granulated substance transfer device connected to said discharge portion of said granulating apparatus to transfer said granulated substance into said screening device.

2. A solid substance granulating apparatus according to claim 1, wherein said drum of said granulating apparatus has an inclined portion which forms an angle of 0° to 20° with respect to horizontal, and said upstream end of said drum is disposed higher than said downstream end of said drum.

3. A solid substance granulating apparatus according to any one of claims 1 or 2, wherein said plurality of kick-back impellers of said granulating apparatus (1) have a height of 1/20 to 1/3 times the diameter of said drum, and (2) are disposed at an inclination angle of 20° to 80°, with respect to an axial line of said drum.

4. A solid substance granulating apparatus according to any one of claims 1 or 2, further comprising:

a waste material separating device disposed at a downstream side of said granulated substance transfer device and having (1) a granulated substance charging port into which said granulated substance is charged, (2) an air jetting portion formed orthogonal to said granulated substance charging port, (3) a waste material discharge port situated opposite said air jetting portion and being larger than said air jetting portion, and (4) a granulated product take-out port spaced apart from said granulated substance charging port; and a blower for feeding air to said air jetting portion.

5. A solid substance granulating apparatus according to claim 4, further comprising:

a dust suction port formed in an upper portion of said crushing machine;

a suction tube connected to said waste material discharge port of said waste material separating device and said dust suction port of said crushing machine; and a dust collector connected to said suction tube to collect dust and and said waste material.

6. A solid substance granulating apparatus according to any one of claims 1 or 2, further comprising:

a frame member disposed on said vehicle;

a cover reception portion disposed at an upper part of said frame member; and a cover swingably disposed at said cover reception portion.

7. A solid substance granulating apparatus according to claim 2, wherein said inclined portion forms an angle of 2° to 15° with respect to horizontal.

8. A solid substance granulating apparatus according to claim 3, wherein said plurality of kick-back impellers of said granulating apparatus (1) have a height of $\frac{1}{10}$ to $\frac{1}{4}$ times the diameter of said drum and, and (2) are disposed at an inclination angle of 45° to 70° with respect to the axial line of said drum.

* * * * *